United States Patent [19]

Haslett et al.

[11] 4,042,282
[45] Aug. 16, 1977

[54] TRACK BUSHING PROVIDING EXTERNAL DEPOSITS OF WEAR RESISTANT MATERIAL

[75] Inventors: Glenn M. Haslett, Peoria; Dennis L. Blunier, Danvers, both of Ill.

[73] Assignee: Caterpillar Tractor Co., Peoria, Ill.

[21] Appl. No.: 644,370

[22] Filed: Dec. 24, 1975

[51] Int. Cl.² .................. B60S 1/68; B62D 55/20
[52] U.S. Cl. ................................ 305/11; 305/57; 308/239
[58] Field of Search ............ 305/11, 12, 57, 58 PC, 305/58 R; 74/230, 255 R, 243 R; 308/237 R, 239

[56] References Cited

U.S. PATENT DOCUMENTS

| | | | |
|---|---|---|---|
| 1,194,463 | 8/1916 | Bache | 308/239 |
| 1,674,623 | 6/1928 | Claus | 308/237 R X |
| 1,762,181 | 6/1930 | Marles | 308/237 R |
| 2,003,528 | 6/1936 | Best | 74/243 R |
| 2,199,292 | 4/1940 | Pierce | 305/57 X |

Primary Examiner—Robert B. Reeves
Assistant Examiner—John P. Shannon
Attorney, Agent, or Firm—Phillips, Moore, Weissenberger, Lempio & Majestic

[57] ABSTRACT

A track chain includes a plurality of track pin bushings as is well known, to seat in recesses defined by a drive sprocket. Each track pin bushing defines a plurality of angled protrusions which act as wear surfaces between the bushing and the sprocket, and also act to force foreign matter from recesses of the sprocket in which bushings are seatable.

6 Claims, 4 Drawing Figures

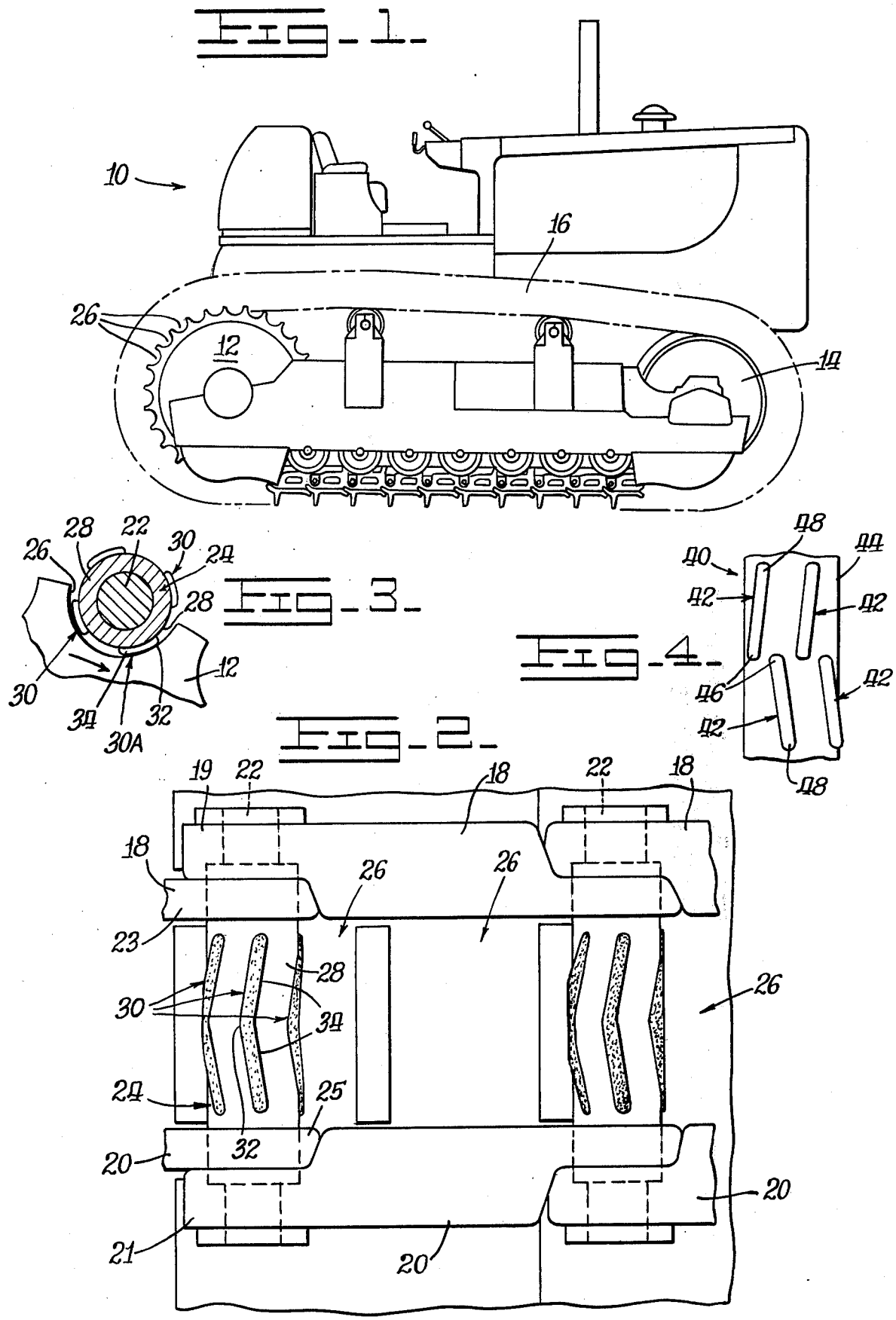

2

TRACK BUSHING PROVIDING EXTERNAL DEPOSITS OF WEAR RESISTANT MATERIAL

BACKGROUND OF THE INVENTION

This invention relates to track pin bushings, and more particularly, to a track pin bushing design wherein a plurality of protrusions are defined thereby, extending from the conventional outer surface thereof.

As is well known, a relatively high degree of wear takes place between track pin bushings and sprockets with which such track pin bushings engage and disengage. Eventually, the track pin bushings show such a high degree of wear that they must be either replaced or turned about their longitudinal axes to present a new wear surface to the sprocket. The problem is compounded by the fact that in general a vehicle utilizing such sprockets and track pins must operate in dirt, mud or the like, resulting in the fact that foreign matter accumulates in areas wherein the track pin bushings and sprocket are joined in contact, resulting in even greater wear.

SUMMARY OF THE INVENTION

It is accordingly an object of this invention to provide means associated with a track pin bushing for providing improved wear characteristics of the track pin bushing.

It is a further object of this invention to provide a track pin bushing which, while fulfilling the above object, aids in removing foreign material from areas of wear thereof, to minimize wear thereof.

It is a still further object of this invention to provide a track pin bushing which, while fulfilling the above objects, is extremely simple in design and manufacture.

Broadly stated, the track pin bushing is seatable in a recess defined by a cooperating sprocket, the track pin bushing defining a track pin bushing outer surface, and a protrusion extending outwardly from such outer surface.

BRIEF DESCRIPTION OF THE DRAWINGS

These and other objects of the invention will become apparent from a study of the following specification and drawings, in which:

FIG. 1 is a side elevation of a vehicle incorporating the invention;

FIG. 2. is a view taken along the line II-II of FIG. 1;

FIG. 3 is a sectional view of a portion of the sprocket and track pin bushing associated therewith, adjacent the upper portion of the sprocket, as the bushing is being disengaged from the sprocket; and FIG. 4 is a plan view of a portion of a second embodiment of track pin bushing.

DESCRIPTION OF THE PREFERRED EMBODIMENTS

Shown in FIG. 1 is a tractor 10 including a drive sprocket 12 and an idler sprocket 14, and a track chain 16 entrained thereabout, as is well known. The track chain 16 is made up of a plurality of links 18,20, with the rearward ends of each pair of links 18, 20 associated with the forward ends of an adjacent pair of links 18, 20 in a well known manner. That is, a track pin 22 has its ends secured to the rearward ends 19,21 of a pair of links 18,20, and has mounted thereon a track pin bushing 24, the ends of which are press fitted into openings defined by the forward ends 23,25 of a pair of links 18,20. One pair of links 18,20 is thus pivotable relative to another pair of links 18,20 about the longitudinal axis of the track pin bushing 24 and the track pin 22. It will be understood that identical structure interconnects other adjacent ends of such links 18,20 to form the continuous track chain 16.

Each track pin bushing 24 is seatable in a recess 26 defined by the drive sprocket 12, and through such drive sprocket 12 the track chain 16 is driven to drive the vehicle 10.

As shown in FIG. 2, the bushing 24 is seated in a recess 26 defined by the sprocket 12. The track pin bushing 24 defines a track pin bushing outer surface 28 which is of conventional cylindrical configuration, and a plurality of elongated protrusions 30 extending outwardly from the outer surface 28, and lying along the longitudinal axis of the track pin bushing 24. Each protrusion 30 is generally V-shaped in configuration, including a base point 32, and legs 34 extending therefrom. The base point 32 of each V-shaped protrusion 30 is positioned substantially at the mid-point of the track pin bushing 24.

It will initially be seen that such protrusions 30 act as wear surfaces between the cylindrical surface 28 of the bushing 24 and the sprocket 12. Such protrusions 30 may with advantage be chosen to be of extremely hard material to add to the overall wear life of such bushing 24.

FIG. 3 shows a bushing 24 at a top portion of the track 16 about to disengage from a recess 26 of a sprocket 12 rotating in the direction shown. The V-shaped protrusions 30 are positioned about the outer surface 28 of the track pin bushing 24 so that, as the track pin bushing 24 moves relative to the sprocket 12 to seat in the recess 26, the base point 32 leads the legs 34 of the V-shaped protrusion 30(A) into the recess 26. It will be seen that, for example, the particular V-shaped protrusion 30(A) acts as a plow to force foreign material from the recess 26 outwardly of the sides thereof. With the base point 32 of each V-shaped protrusion 30 positioned substantially at the mid-point of the track pin bushing 24, it is insured that substantially equal plowing effect is provided to both sides of the sprocket 12 from such recess 26 thereof.

Shown in FIG. 4 is an alternate embodiment of track pin bushing 40. Such track pin bushing 40 defines a plurality of protrusions 42, angled relative to the longitudinal axis of the track pin bushing 40. Such protrusions 42 are positioned generally about the outer surface 44 of the track pin bushing 40. Each elongated protrusion 42 has one end 46 positioned adjacent the mid-point of the track pin bushing 40, and the other end 48 adjacent an end of the bushing 40. With the bushing 40 of FIG. 4 positioned as shown in place of the bushing 24 shown in FIG. 3, the one end 46 of a protrusion 42 in a position to contact the sprocket 12 leads the other, outer end 48 of the protrusion 42 as the track pin bushing 40 moves relative to the sprocket 12 to seat in the recess 26 of the sprocket 12. Such protrusions 42, it will be seen, again act as additional wear material between the outer surface 44 of the track pin bushing 40 and the sprocket 12, and also act to plow or force foreign material from such recess 26 of the sprocket 12 as the track pin bushing 40 seats in such recess 26.

We claim:

1. For use with a sprocket of a track-type vehicle, a track pin bushing seatable in a recess defined by the sprocket, said track pin bushing defining a track pin bushing outer surface, and a protrusion extending outwardly from said outer surface, the protrusion acting to force foreign material from the recess of the sprocket as the bushing seats in the recess, wherein the protrusion defined by the track pin bushing is an elongated protrusion angled relative to the longitudinal axis of the track pin bushing.

2. The track pin bushing of claim 1 and further comprising a plurality of elongated protrusions positioned generally about the outer surface of the track pin bushing, each protrusion being angled relative to the longitudinal axis of the track pin bushing.

3. The track pin bushing of claim 1 wherein one end of the elongated protrusion is adjacent the mid-point of the track pin bushing, and the other end of the elongated protrusion is adjacent an end of the bushing, wherein the one end of the protrusion leads the other end of the protrusion as the track pin bushing moves relative to a sprocket to seat in a recess of a sprocket.

4. For use with a sprocket of a track-type vehicle, a track pin bushing seatable in a recess defined by the sprocket, said track pin bushing defining a track pin bushing outer surface, and a protrusion extending outwardly from said outer surface, the protrusion acting to force foreign material from the recess of the sprocket as the bushing seats in the recess, wherein the protrusion is an elongated protrusion generally V-shaped in configuration.

5. The track pin bushing of claim 4 wherein the base point of the V-shaped protrusion is positioned so that such base point leads the legs of the V-shaped protrusion as the track pin bushing moves relative to a sprocket to seat in a recess of a sprocket.

6. For use with a sprocket of a track-type vehicle, a track pin bushing seatable in a recess defined by the sprocket, said track pin bushing defining a track pin bushing outer surface, and a protrusion extending outwardly from said outer surface the protrusion acting to force foreign material from the recess of the sprocket as the bushing seats in the recess, wherein the track pin bushing defines a plurality of elongated protrusions positioned generally about the outer surface thereof, each elongated protrusion lying generally along the longitudinal axis of the track pin bushing, wherein each elongated protrusion is generally V-shaped in configuration, wherein the base point of each V-shaped protrusion is positioned substantially at the mid-point of the track pin bushing.

* * * * *